United States Patent [19]

Emmett

[11] Patent Number: 5,243,424
[45] Date of Patent: Sep. 7, 1993

[54] APPARATUS AND METHOD FOR THE MEASUREMENT OF TUNING DELAY BETWEEN A VIDEO SIGNAL AND AN AUDIO SIGNAL

[75] Inventor: John R. Emmett, Hampton, England

[73] Assignee: Thames Television plc, London, England

[21] Appl. No.: 700,696

[22] Filed: May 16, 1991

[30] Foreign Application Priority Data

May 16, 1990 [GB] United Kingdom ............... 9010961

[51] Int. Cl.$^5$ ............................................. H04N 5/04
[52] U.S. Cl. ...................................... 358/143; 358/148
[58] Field of Search ............... 358/139, 143, 145, 149, 358/144, 148, 198, 337, 339; 360/31; 369/91

[56] References Cited

U.S. PATENT DOCUMENTS

| | | | |
|---|---|---|---|
| 3,835,253 | 9/1974 | Bond | 358/149 |
| 4,703,355 | 10/1987 | Cooper | 358/149 |
| 4,851,909 | 7/1989 | Noske et al. | 358/198 |
| 4,963,967 | 10/1990 | Orland et al. | 358/149 X |

FOREIGN PATENT DOCUMENTS

| | | | |
|---|---|---|---|
| 0046683 | 3/1985 | Japan | 358/148 |
| 0170376 | 9/1985 | Japan | 358/148 |
| 0229589 | 11/1985 | Japan | 358/148 |

Primary Examiner—Victor R. Kostak
Attorney, Agent, or Firm—Keck, Mahin & Cate

[57] ABSTRACT

A system for the measurement of delay between a video signal and an audio signal includes a tone-burst generator circuit (9) which marks an audio signal (3). The mark is then used as a reference which is detected at both signals' destination (15) and the timing delay between the signals is displayed (19) and may be corrected (17, 18).

12 Claims, 2 Drawing Sheets

APPARATUS AND METHOD FOR THE MEASUREMENT OF TUNING DELAY BETWEEN A VIDEO SIGNAL AND AN AUDIO SIGNAL

BACKGROUND OF THE INVENTION

The present invention relates to a system for the measurement of error in audio-to-video timing and for the correction of such an error, and has particular, though not exclusive, relevance to television broadcasting and receiving system.

It is well known that during broadcast of television signals, the audio and video signals may be processed separately, for example, one signal may be broadcast via satellite and the other via territorial cable.

If such processing is carried out over a large enough distance, it can often be the case that the two signals arrive at their destination out of synchronisation.

There exist limits within which such temporal distortions are imperceptable to human—generally 40 ms for audio-late and 20 ms for video-late signals. Errors beyond these limits are not generally easy to quantify and correct by operator perception alone.

It is desirable that such errors be corrected so that no perceivable temporal delay occurs between the video and audio signals.

One solution is that proposed in UK Patent Application number GB 2181325A. The circuit disclosed therein performs the encoding of audio timing signals on the video signal in an encoder at the transmitter prior to transmission, and the decoding in a decoder at the receiving location of the audio timing signals from the video signal after transmission. The decoded audio timing signals are compared to timing signals derived from the transmitted audio signal, and a delay factor is generated in a unit to represent the relevant delay between the transmitted audio and video signal.

In this system, because the timing reference signal is inserted on the video signal in the vertical blanking period, processing of the video signal could involve removal and re-insertion of the blanking.

SUMMARY OF THE INVENTION

It is an object of the present invention to at least alleviate the aforementioned problems by providing a system for the detection and correction of digital-audio delay wherein the timing reference signal is inserted on the audio signal.

Accordingly, the present invention provides a system for the measurement of timing delay between a video signal and an audio signal propagating between a source and a destination, the system including; detecting means for detecting a temporary cut of at least a predetermined time of the video signal at the source; marking means for marking the audio signal in response to the cut; marking detection means for detecting the marking at the destination; and display means for displaying, at the destination, the timing relationship between the video and audio signals. Thus, the invention has the advantage over prior art systems in that, because the timing reference signal is inserted on the audio signal and not the video signal, the timing reference signal is not affected by the processing of the video signal such as standards conversion and synchronisation.

Preferably, the means for marking the audio signal is effective to mark the signal so that the mark is inaudible to the human ear, yet is electronically detectable by the means for detecting the mark at the destination of the signal. Thus no interference of the transmission will be perceived by the listener.

Preferably, the means for marking the audio signal is a tone-burst generator circuit. The tone-burst generator circuit preferably includes two digital filters and an attenuator.

The means for displaying the timing relationship between the audio and video signals preferably includes a correlation detector. Additionally, it is advantageous to include at the display means, variable delays on both the video and audio signals in order to correct any delay which occurs.

DESCRIPTION OF THE DRAWINGS

One preferred embodiment of the present invention will now be described, by way of example only, with reference to the following drawings of which.

Figure 1:
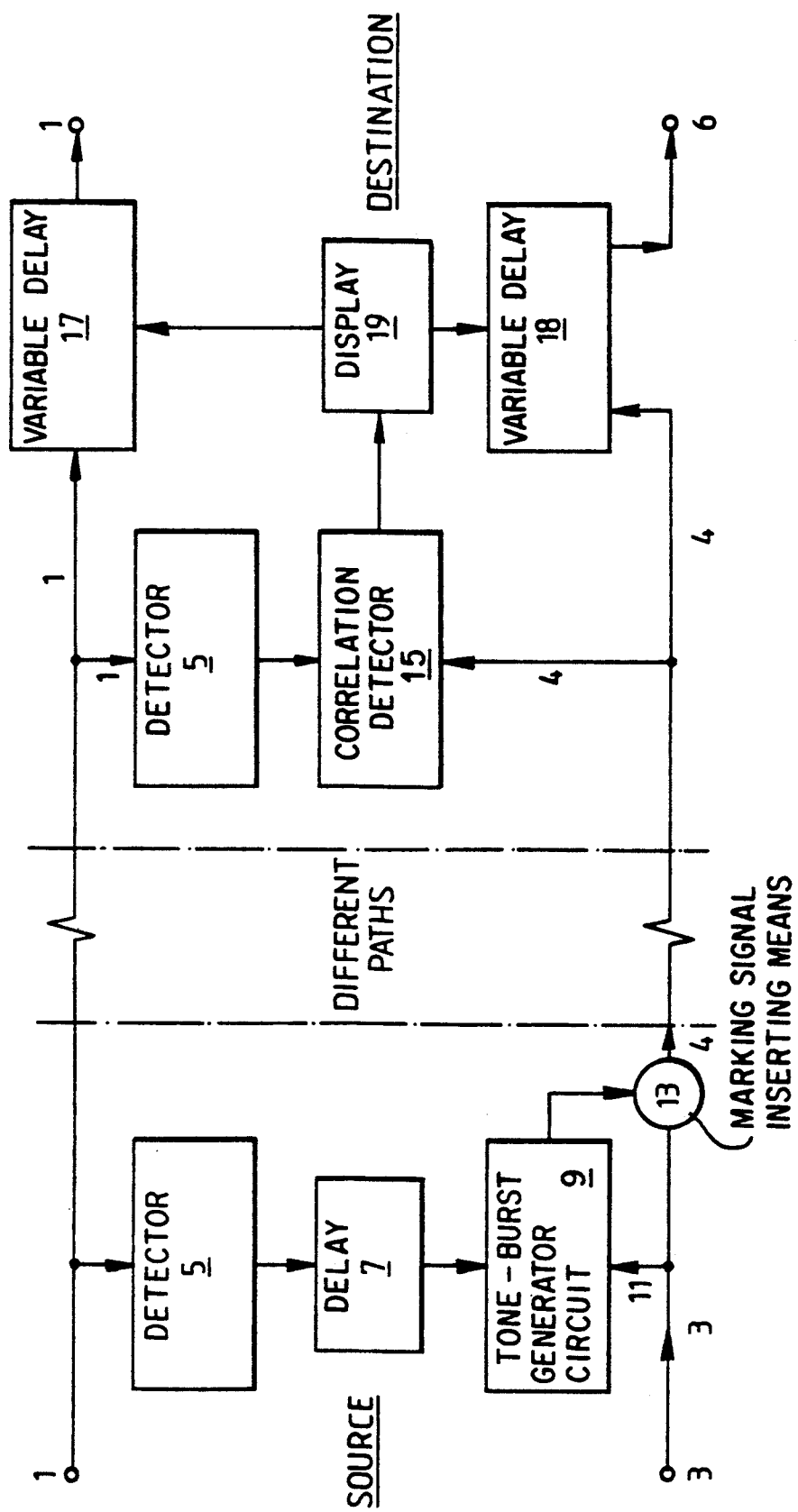
FIG. 1 shows a block diagram of a system in accordance with the present invention.

Referring firstly to FIG. 1, at the source of the transmission are two separate channels, the video channel 1 and the audio channel 3.

A detector 5 on the video channel 1 detects vision cuts in the video signal and feeds this information to the delay 7. The delay 7 supplies the tone-burst generator circuit 9 which, after a known accurate delay of typically one second inserts a marking signal on to the audio channel 3 at point 13. The tone-burst generator circuit 9 is also fed with the unmarked audio signal 11 as a reference.

Figure 2:
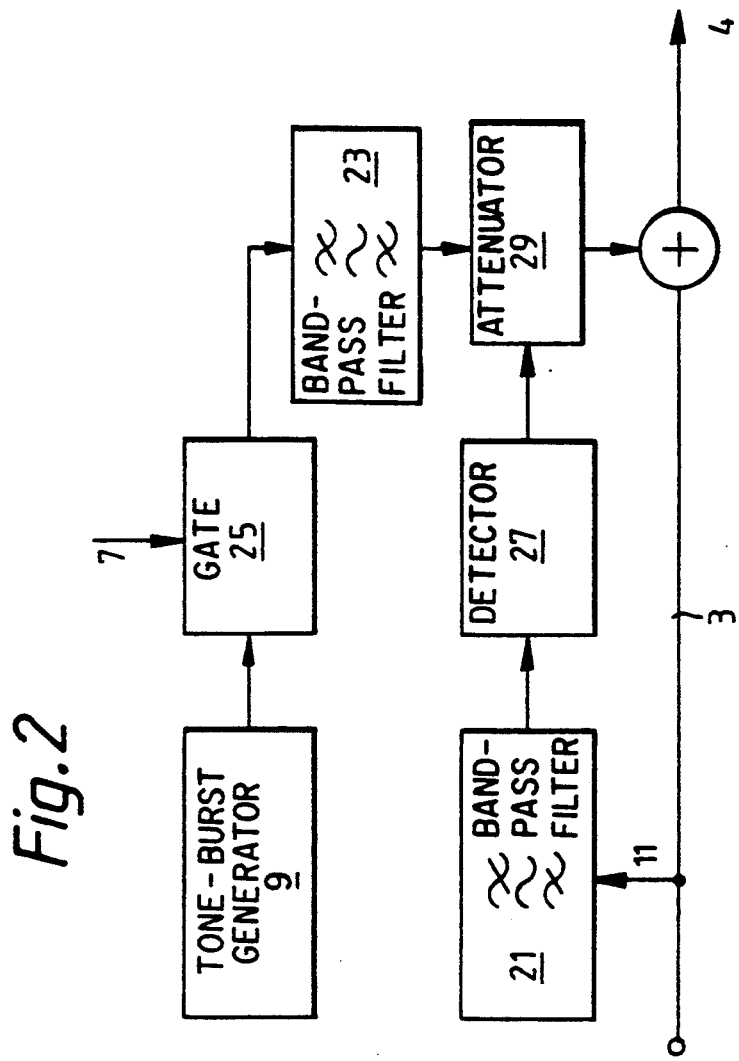
FIG. 2 shows in more detail the tone-burst generator of FIG. 1.

Referring now also to FIG. 2, in which a tone-burst generator 9a is shown in more detail, both the marking signal and the video signal from delay 7 pass through gate 25 and are then filtered by a band-pass filter 23 to an attenuator 29. The attenuator 29 adjusts the amplitude of the tone-burst so that its presence in the audio signal is of sufficient amplitude to be detected by the electronic processing equipment in the system, but is not audible to the person listening to the transmission. Hence the marking signal is always masked by the programme material or background noise within the same band of frequencies, taking account of the frequency masking pattern of normal hearing.

There is a further input to the attenuator 29, and this is a second band-pass filter 21 and a detector 27. The filters 21, 23 may be chosen so as to be of similar specification so that the bandwidth of the detected signal is the same as the bandwidth occupied by the marking signal, and by employing well-known digital techniques for filters 21, 23, advantage may be made from locking their frequency response to the tone-burst generator 9 so as to ensure optimum tuning at all times.

At the destination stage of the transmission, the unblemished video signal 1 is detected by detector 5 and the marked audio signal 4 by a correlation detector 15. The video signal 1 from detector 5 is also fed into the correlation detector 15 wherein the resultant audio-to-video timing relationship is ascertained as a result of the possible differing path lengths taken by the two separate signals, and the result displayed at display 19.

The two separate video and audio signals 1,4 are also fed, in combination with the detected delay, to respective variable delays 17, 18 so that correction of the delay may automatically take place by adjustment of either of the video or audio variable delays 17, 18.

From these delays 17, 18 may then proceed the respective synchronoms, video and audio signals 1, 6.

Thus, by inserting a marking signal on the audio, and not the video signal—as in the prior art—no interference of the video blanking signal is required, this is merely utilised as a reference for the marking signal.

It will be appreciated that the system as herebefore described may equally well operate in either analogue or digital mode, as required by the operator.

It will further be appreciated by those skilled in the art that the differing path lengths referred to in the transmission of the video and audio signals need not be generated by direct transmission only. Any path length difference generated, for example, by recording or playback will serve the same purpose, as the system is effective to measure the relative delay between.

I claim:

1. A system for the measurement of timing delay between a video signal and an audio signal propagating between a source and a destination, the system including;
    detection means for detecting a temporary cut of at least a predetermined time of the video signal at the source;
    marking means for marking the audio signal in response to the cut;
    marking detection means for detecting the marking at the destination;
    and display means for displaying, at the destination, the timing relationship between the video and audio signals.

2. A system according to claim 1 further including adjustment means for adjusting the timing relationship between the video and audio signals at the destination.

3. A system according to claim 1 wherein the marking means is effective to mark the signal so that the mark is inaudible to the human ear, yet is electrically detectable by the marking detection means.

4. A system according to claim 1 wherein the marking means comprises a tone-burst generator.

5. A system according to claim 1 wherein the display means includes a correlation detector.

6. A system according to claim 4 wherein the tone-burst generator comprises a gated tone generator, two band-pass filters and an attenuator.

7. A system according to claim 6 wherein digital-mode use of the band-pass filters enables their frequency response to be locked to that of the gated tone generator.

8. A system according to claim 1 wherein the adjustment means for adjusting the timing relationship between the audio and video signals comprises respective variable delays.

9. A system according to claim 2 wherein the adjustment means for adjusting the timing relationship between the audio and video signals comprises respective variable delays.

10. A system according to claim 1 wherein the display means comprises a digital time display.

11. A method of measuring a timing delay between a video signal and an audio signal propagating between a source and a destination, the method including:
    detecting a temporary cut of at least a predetermined time of the video signal at the source;
    marking the audio signal in response to the cut;
    detecting the marking at the destination;
    and displaying, at the destination, the timing relationship between the video and audio signals.

12. A method according to claim 11 further including adjusting the timing relationship between the video and audio signals at the destination.

* * * * *